J. BUCHLI.
DRIVING MECHANISM FOR ELECTRIC LOCOMOTIVES.
APPLICATION FILED SEPT. 28, 1917.
1,296,754. Patented Mar. 11, 1919.
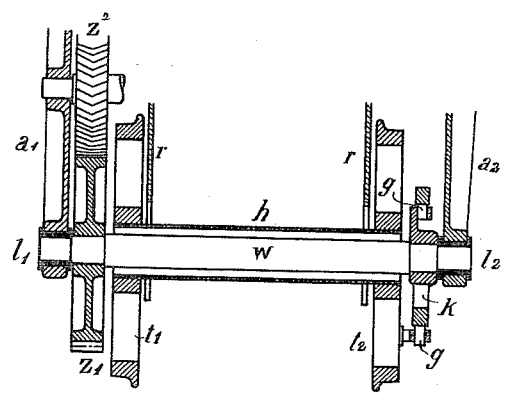
J. Buchli
INVENTOR
BY Albert K. Parker
ATTORNEY

UNITED STATES PATENT OFFICE.

JACOB BUCHLI, OF BADEN, SWITZERLAND, ASSIGNOR TO A. G. BROWN BOVERI & CIE., OF BADEN, SWITZERLAND.

DRIVING MECHANISM FOR ELECTRIC LOCOMOTIVES.

1,296,754.  Specification of Letters Patent.  Patented Mar. 11, 1919.

Application filed September 28, 1917. Serial No. 193,855

*To all whom it may concern:*

Be it known that I, JACOB BUCHLI, a citizen of the Swiss Republic, residing at No. 18 Ländliweg, Baden, Switzerland, have invented certain new and useful Improvements in Driving Mechanism for Electric Locomotives, of which the following is a specification.

In existing driving mechanisms for electric locomotives having outside toothed wheel gear, the toothed wheels of the gear are mounted in parts of the framing of the locomotive, and the transmission of the torque from the spring-supported gear to the non-spring supported driving axle is effected by means of two Cardan joints connected together by an intermediate shaft. Owing to the limited width of the available space and for the purpose of providing good access to the bearings and to the Cardan joints, it is necessary to mount not only the driving wheels upon a hollow axle but also to mount the driving toothed wheel upon a hollow shaft. This drawback is removed according to this invention by employing instead of two Cardan joints, a single universal joint capable of yielding in all directions, such as for instance a Cardan joint having a longitudinal play of the pins or having a spring suspension of the pins of the kind described in German Patent 295224. The whole arrangement of the driving mechanism is thereby rendered much more simple and stable because it is then possible to mount the shaft carrying the driving toothed wheel in fixed bearings in the locomotive framing outside the driving wheels. By arranging the driving toothed wheel and the Cardan joint on opposite sides of the driving axle outside the driving wheels, all the parts are rendered well accessible from the outside, and the movements of the Cardan joint cannot have any unfavorable influence upon the toothed wheels and their engagement.

An embodiment of the invention is illustrated in the accompanying drawing.

As shown, the driving wheels $t_1$ $t_2$ which are supported on springs relatively to the locomotive framing $r$, are mounted on the hollow shaft $h$. $w$ is a solid shaft extending through the hollow shaft $h$. This solid shaft $w$ is mounted at both ends $l_1$ $l_2$ in the side plates or arms $a_1$ $a_2$ connected to the spring-supported locomotive framing. The hollow shaft $h$ is connected to the solid shaft $w$ by means of a Cardan coupling $k$ which is located outside the wheel $t_2$, and whose joint pins $g$ have a certain amount of play in their longitudinal direction, that is to say, at right angles to the shaft $w$. This coupling $k$ is shown diagrammatically in the drawing. In the coupling as shown the pins $g$ are 90° apart, the coupling being a Cardan coupling of known form; the pins have play in their bearings, which allows the coupled shafts to move in both a parallel and angular direction. The construction of the coupling is, however, quite immaterial for the invention, provided the coupling can yield in all directions, that is to say, it must allow the two shafts to move parallelly and also angularly. Instead of the coupling as shown, any other construction would do equally well, for instance the coupling described in German Patent No. 219963, or the one described in German Patent No. 295224, or the one described in Buchli's U. S application Serial No. 203349 of 22nd November, 1917. $z_1$ is the driving toothed wheel which is mounted on the shaft $w$ outside the wheel $t_1$. The engagement of this wheel $z_1$ with the wheel $z_2$ is secured by mounting the two wheels in the common side plate $a_1$ and by a stable mounting of the two ends $l_1$ $l_2$ of the shaft $w$. By this arrangement all parts are easy of access from the outside.

What I claim is:—

Driving mechanism for electric locomotives having motors located in the framing thereof with toothed wheel transmission gear outside said framing, comprising a driving toothed wheel, a driven toothed wheel in mesh with said driving wheel, a solid shaft on one end of which said driven wheel is mounted, fixed bearings in the framing for said shaft, a hollow shaft on which the rail wheels are attached, said hollow shaft surrounding the solid shaft, a universal coupling mounted on the other end of the solid shaft, and projections on one of the rail wheels engaged by said coupling.

In testimony whereof I have signed my name to this specification.

JACOB BUCHLI.

Copies of this patent may be obtained for five cents each, by addressing the "Commissioner of Patents, Washington, D. C."